No. 628,525. Patented July 11, 1899.
G. W. CHANDLER.
SCALE.
(Application filed Aug. 19, 1898.)
(No Model.) 3 Sheets—Sheet 1.
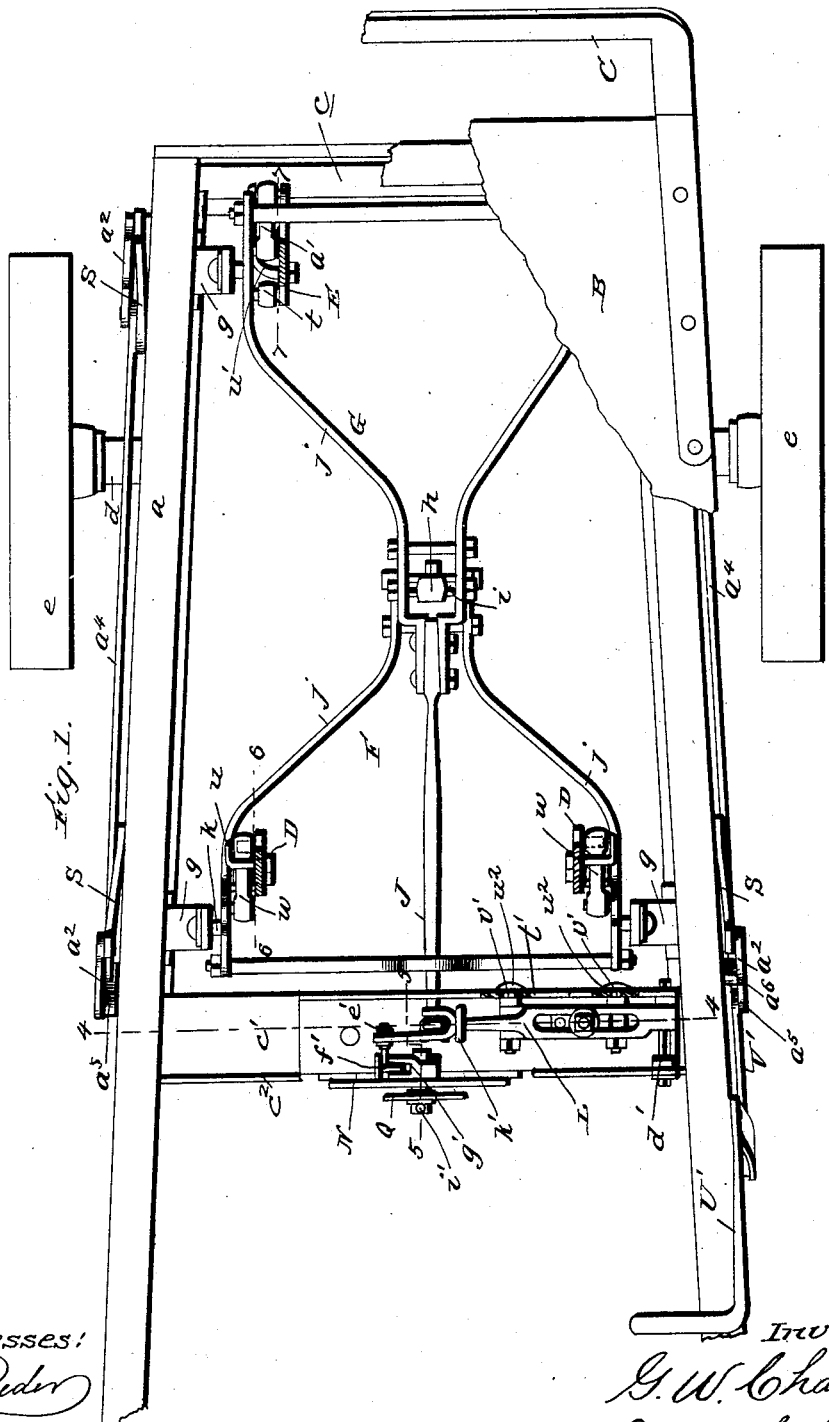
Witnesses:
Inventor
G. W. Chandler
By Jas. J. Sheehy
Attorney

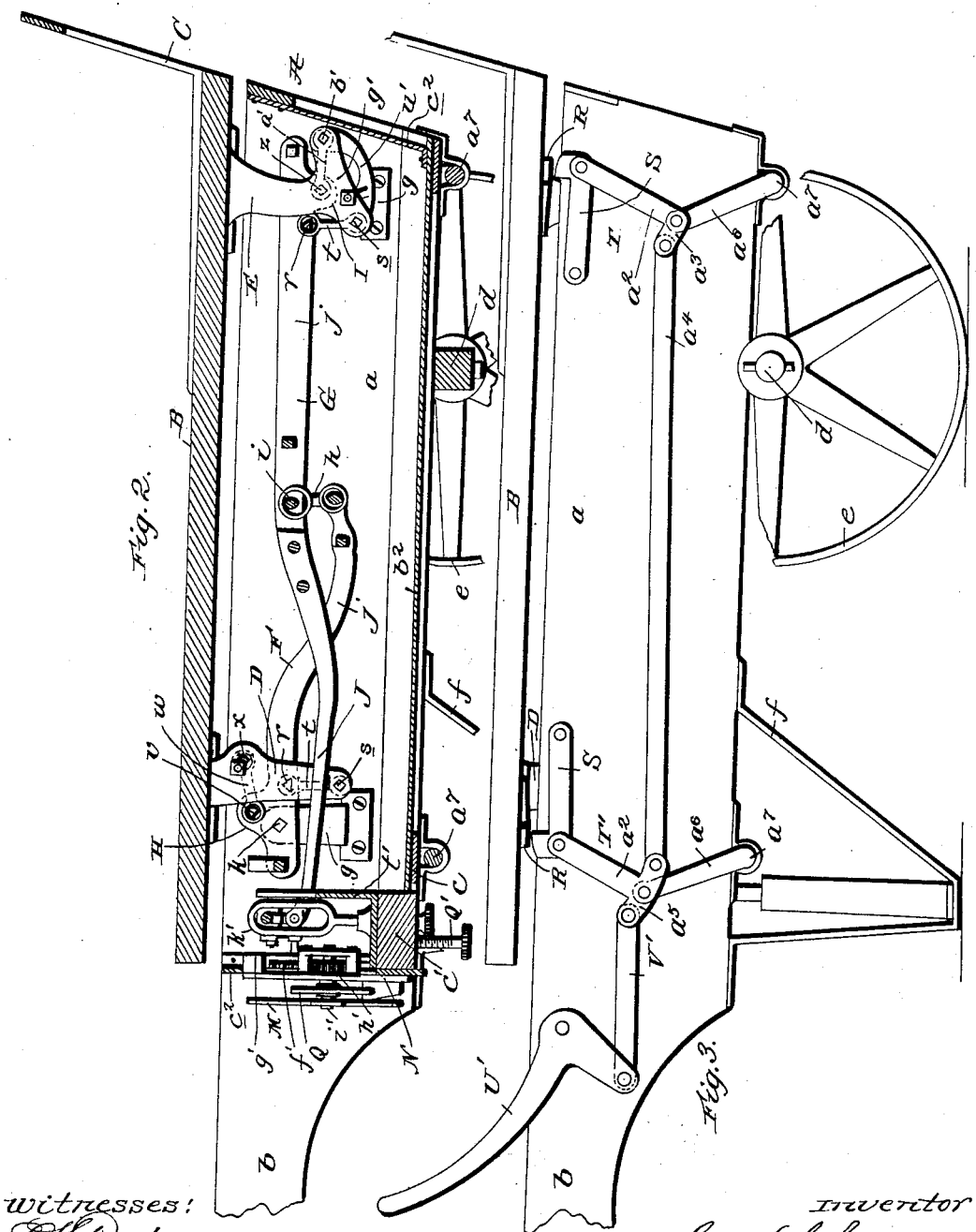

No. 628,525. Patented July 11, 1899.
G. W. CHANDLER.
SCALE.
(Application filed Aug. 19, 1898.)
(No Model.) 3 Sheets—Sheet 3.
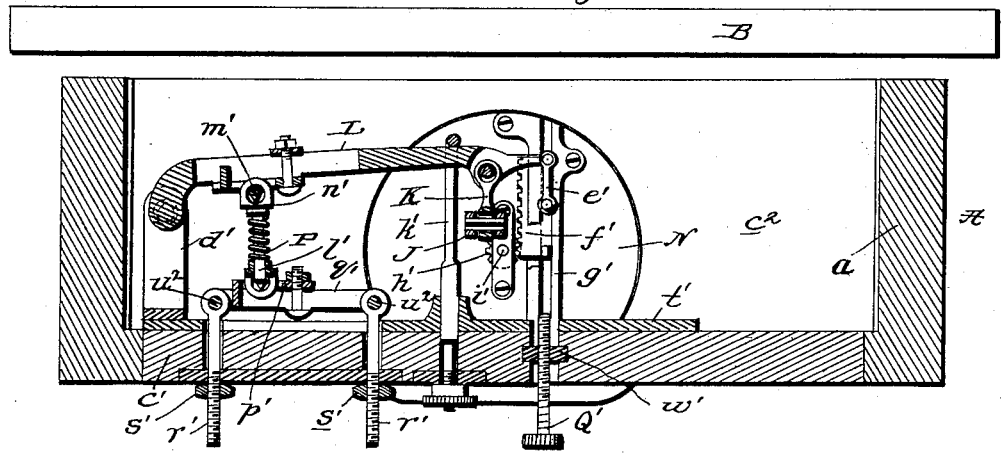
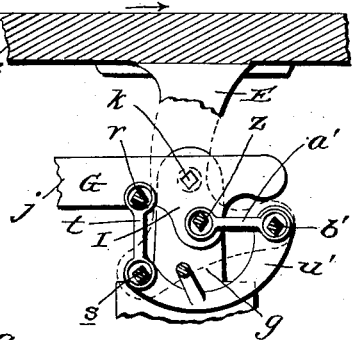
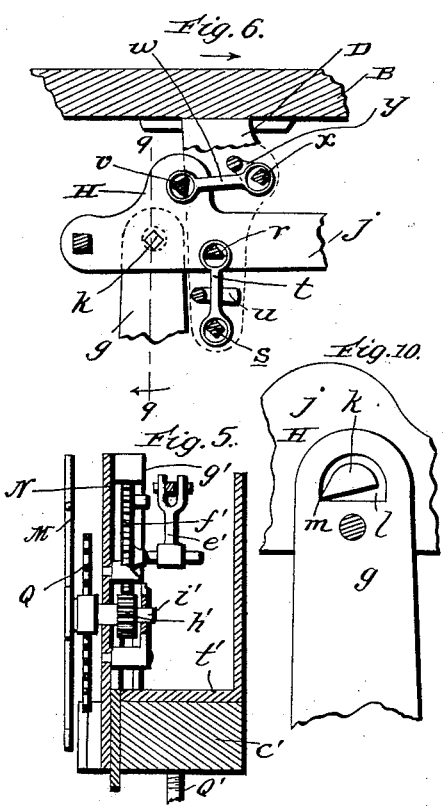
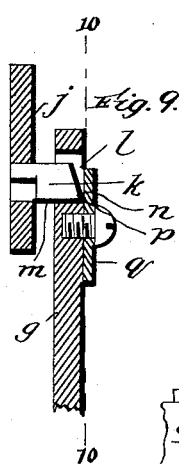
Witnesses:
Inventor
G. W. Chandler.
By Jas. J. Sheehy
Attorney
THE NORRIS PETERS CO., PHOTO-LITHO., WASHINGTON, D. C.

UNITED STATES PATENT OFFICE.

GEORGE W. CHANDLER, OF MANHATTAN, KANSAS, ASSIGNOR OF ONE-HALF TO WILLIAM C. SNOW, OF BOSTON, MASSACHUSETTS.

SCALE.

SPECIFICATION forming part of Letters Patent No. 628,525, dated July 11, 1899.

Application filed August 19, 1898. Serial No. 688,991. (No model.)

*To all whom it may concern:*

Be it known that I, GEORGE W. CHANDLER, a citizen of the United States, residing at Manhattan, in the county of Riley and State of Kansas, have invented new and useful Improvements in Scales, of which the following is a specification.

My invention relates to that class of scales which are combined with hand-trucks and known as "truck-scales;" and it has for one of its objects to provide a truck-scale embodying such a construction that it is enabled to weigh with equal accuracy when the truck is in a horizontal or approximately horizontal position and at rest, and also when the truck is in an inclined position and in motion, thus enabling a truckman to perceive the weight of an article placed on the truck while the same is at a standstill and also when he has lifted one end of the truck and is moving the same from one point to another.

Another object is to provide simple means through the medium of which the scale-platform with a burden thereon may be very easily raised by the truckman, supported, and locked against both vertical and endwise play, so as to take the weight of the burden off the scale mechanism after said burden has been weighed, and thus relieve the scale mechanism while the device is being used simply as a truck.

The invention also contemplates mounting the scale mechanism in the main frame of the truck in such a manner that friction incident to lateral or sidewise thrust of the platform will be reduced to a minimum and prevented from rendering the scale inaccurate.

Other objects of the invention will be fully understood from the following description and claims when taken in conjunction with the annexed drawings, in which—

Figure 1 is a plan view of a truck embodying my invention, with some parts in section and others partly broken away. Fig. 2 is a longitudinal central section with parts broken away. Fig. 3 is a side elevation, with parts broken away, illustrating the mechanism for raising, supporting, and locking the platform against vertical and endwise movement. Fig. 4 is an enlarged transverse section taken in the plane indicated by the line 4 4 of Fig. 1. Fig. 5 is an enlarged transverse section taken in the plane indicated by the line 5 5 of Fig. 1. Figs. 6 and 7 are detail sections taken in the planes indicated by the lines 6 6 and 7 7, respectively, of Fig. 1. Fig. 8 is a detail elevation of the dial and pointer, together with the spring, for returning the pointer to its normal position. Fig. 9 is a detail section taken in the plane indicated by the line 9 9 of Fig. 6. Fig. 10 is a detail section taken in the plane indicated by the line 10 10 of Fig. 9.

In the said drawings similar letters designate corresponding parts in all of the several views, referring to which—

A is the main frame of a truck, which is preferably formed by side pieces $a$, terminating at their rear ends in handles $b$ and connected together by cross-bars $c\ c'$. This frame A is arranged upon and connected to an axle $d$, carrying traveling wheels $e$, and is provided in rear of said axle with suitable legs $f$, designed to support it in a horizontal or approximately horizontal position, as shown in Fig. 3. It is also provided, preferably, on the inner sides of its side pieces $a$ with four brackets $g$, for a purpose presently pointed out.

B is a platform separate from but disposed above the frame A and having a guard C at its forward end.

D designates depending arms connected to the platform adjacent to the rear corners thereof.

E designates depending arms connected to the platform adjacent to the forward corners thereof and differing from the arms D in that they have T-heads $g'$ at their lower ends, and F G designate the multiplying-levers of the scale mechanism. These levers are of the ordinary general form, and the inner end of the lever F is disposed below and connected with the inner end of the lever G by a link $h$, which engages knife-edge bearings $i$ on the levers, as shown. Both levers are provided adjacent to the outer ends of their arms $j$ with short lateral lugs $k$, which bear in apertures $l$ in the brackets $g$ and have longitudinal knife-edges $m$ and beveled ends $n$, said beveled ends serving, in conjunction with the edges, to form points $p$, as best shown in Figs. 9 and 10. These points $p$ bear against disks $q$, which form the outer end walls of the apertures $l$ and are connected to the outer sides of the brackets $g$ by screws. Said points $p$ are provided in order to reduce to a minimum the friction incident to the lateral thrust of the platform and scale mechanism and prevent the same from rendering the scale inaccurate, which is obviously an important function.

The arms $j$ of the levers F G are provided, as best shown in Fig. 6, with short inwardly-directed lugs $r$, which have edges, as shown, and are connected with similar lugs $s$ on the arms D E of the platform B by links $t$, the said links having eyes receiving the lugs $r$ $s$ and being preferably held against casual displacement by guards $u$ $u'$ on the arms D E, respectively, as shown. The connection of the links $t$ to the levers F G is between the inner ends and fulcrum-points of said levers, and consequently it will be seen that when the platform B is depressed by a weight exerting downward pressure in a direction at right angles to the length of the platform, as is the case when the platform is horizontal, the inner ends of the levers will be depressed after the ordinary well-known manner. In order that the levers F G may also be depressed by a weight exerting a pressure in the direction of the length of the platform, as when the weighing is effected with the truck in an inclined or canted position, the lever F is provided on both of its arms $j$, at points slightly within its fulcrum-point, with upwardly-directed branches H, while the lever G is provided on both its arms, at points slightly without its fulcrum-point, with downwardly-directed branches I. The branches H on the arms of lever F are provided with inwardly-directed lugs $v$, which have suitable knife-edges and are connected by links $w$ with lugs $x$ on the arms D of the platform, the said links preferably having eyes receiving the lugs and being held against casual displacement by suitable guards $y$ on the arms D. The branches I on the arms of the lever G are provided with inwardly-directed lugs $z$, (see Fig. 7,) which have suitable knife-edges and are connected by links $a'$ with lugs $b'$ on the forward ends of the T-heads of the arms E, the said links being preferably provided with eyes receiving the lugs and being held against casual displacement by the guards $u'$, before described, which, as best shown in Fig. 7, are connected to the T-heads of the arms E.

As best shown in Figs. 6 and 7, the arms D on platform B are disposed in advance of the branches H on lever F and the forward ends of the T-heads of the arms E are disposed in advance of the branches I on lever G. It follows from this that when the platform B is moved lengthwise in the direction indicated by arrow by a weight imposed upon it while it is inclined the branches H of lever F will be rocked in the direction indicated by arrow and the branches I of lever G will be rocked in the opposite direction, as indicated by arrow, with the result that the inner ends of both levers will be depressed. It will also be observed that the connections between the arms D E and the levers F G are such that pressure on the platform in the direction of the thickness thereof and pressure on said platform in the direction of its length will be simultaneously communicated to the multiplying-levers.

The forward multiplying-lever G is provided with a rearward extension J, which occupies the longitudinal center of the truck-scale and extends to the rear end of the main frame A, where it is connected by a link K and knife-edge bearings with a beam or lever L, disposed at right angles to the extension J and fulcrumed at its outer end in suitable standards $d'$, rising from the cross-bar $c'$, as best shown in Fig. 4. This lever L in turn is connected by a link $e'$ with a vertically-movable rack $f'$, arranged in a guideway $g'$ and intermeshed with a pinion $h'$ on the arbor $i'$ of a pointer M, whereby it will be seen that when the free end of the lever L is depressed the pointer will be moved in the direction indicated by arrow, (see Fig. 8,) while when said end of the lever is raised the pointer will be moved in the opposite direction and returned to its position at zero. The arbor $i'$ of the pointer M is journaled in the center of a dial-plate N, and the pointer is disposed in front of said dial-plate, which is provided on its face with graduations suitable to a truck-scale.

The lever L is depressed through the medium of the extension J of lever G when a weight is imposed on the scale-platform, and it is raised when the weight is removed by a spring P. (Better shown in Fig. 4.) The raising of the lever by the spring P returns the pointer M to zero on the dial-plate, and in this the said spring P is assisted by a spring Q, which is connected to and coiled about the arbor $i'$ and is connected at its outer end to the dial-plate. The spring P not only returns the lever L to its normal position and normally holds it against an adjustable stop $k'$, but it cushions the downward movement of said lever, and thereby renders it more regular in its movements, which contributes to the accuracy of the scale.

The spring P surrounds a rod $l$, which engages a knife-edge bearing $m'$, adjustably connected to the lever L, and said spring is interposed between a shoulder $n'$ on the rod $l'$ and a guide $p'$, which loosely receives said rod. The guide $p'$ is adjustably connected to a slotted body $q'$, which is adjustably connected to the bar $c'$ of the main frame by bolts $r'$ and nuts $s'$ and to a transversely-arranged plate $t'$ by bolts $u^2$, which take through slots $v'$ in the plate and are provided with nuts, as shown. It follows from this that the tension of the spring P and the throw of the lever L may be readily adjusted to properly regulate the scale when desired, a slight adjustment being effected by moving the guide $p'$ with respect to the body $q'$ and the bearing $m'$ with respect to a lever L and a material adjustment by moving the body $q$ alone or together with the guide $p'$ and bearing $m'$, as is found necessary.

$Q'$ is a stop which has for its purpose to limit the downward movement of the rack $f'$. This stop $Q'$ is in the form of a screw and engages a fixed nut $w'$ in the frame-bar $c'$ in order that it may be adjusted to accord with the adjustment of the throw of the lever L.

By virtue of the construction thus far described it will be appreciated that the weight of a burden placed on the platform B will be accurately indicated by the pointer M in conjunction with the dial N, and this no matter whether the platform is horizontal or inclined to a considerable extent. This is a highly-important advantage, since it enables the truckman to perceive the weight of the burden on the platform B while the truck is resting on the wheels and feet or while he has one end of the truck raised and is moving the same from one point to another. It is also advantageous because it obviates the necessity of the truckman releasing his hold and lowering the truck to a horizontal position in order to weigh a burden placed on the platform of the truck.

With a view of relieving the scale mechanism when not in use, and thereby prolonging the usefulness of the same, I provide the mechanism better illustrated in Figs. 1 to 3 for raising, supporting, and holding the platform B against movement. This mechanism comprises lugs R on the under side of the platform B, adjacent to the ends and side edges thereof, platform-supporting devices or arms S, pivotally connected to the side pieces of the main frame A and arranged to engage the lugs R and impinge against the under side of the platform B, forward and rear toggle-levers T T', and a hand-lever U', which is fulcrumed on one side piece $a$ of the frame and is connected by a link V with one toggle-lever. The upper members $a^2$ of the toggle-levers are pivotally connected at their upper ends to the arms S and are provided at their lower ends with angular branches $a^3$, to which pitmen $a^4$ are connected, as shown. The upper member of the right-hand toggle-lever T' is also provided with an angular branch $a^5$ for the pivotal connection of the link V', as shown in Fig. 3. The lower members $a^6$ of the toggle-levers are pivotally connected at their upper ends to the lower ends of the members $a^2$, and the lower members $a^6$ at opposite sides of the main frame are connected by rock-shafts $a^7$, journaled beneath the main frame A, so as to obviate the necessity of providing hand-levers at each side of the frame. By virtue of this construction it will be seen that with the parts in the position shown in Fig. 3 the platform B is supported upon the multiplying-levers and the scale is ready for use. When it is desired to relieve the scale mechanism and use the device simply as a truck, it is simply necessary to depress the hand-lever U' until its free end bears upon the adjacent handle $b$ of the main frame. With this done the lower and upper members of the toggle-levers will have assumed a position in alinement with each other, thus raising the platform and taking the weight of the same and any burden that may be thereon off the multiplying-levers. In such position there is no tendency of the toggle-levers to flex, and hence no liability of the platform casually resuming its position and imposing its weight on the multiplying-levers. When, however, it is desired to use the scale, it is simply necessary to raise the free end of the lever U', when the arms S will be disengaged and lowered away from the platform to enable the same to resume its position on the multiplying-levers. Because of the great leverage afforded by the mechanism just described but very little effort is required to lift the platform B and any burden thereon off the multiplying-levers and lock the members of the toggle-levers in their alined position, which is an important advantage.

With a view of excluding dust, moisture, &c., from the scale mechanism I contemplate providing the main frame A with bottom and end walls $b^2 c^2$, which are preferably of sheet metal.

I have entered into a specific description of the construction and relative arrangement of the several parts of my improved scale in order to impart a full, clear, and exact understanding of the same. I do not desire, however, to be understood as confining myself to the specific embodiment of my invention herein shown and described, as such changes or modifications may be made in practice as fairly fall within the scope of my invention. I also do not desire to be understood as limiting myself to the use in a truck-scale of such parts of my invention as are adapted to be used to advantage in scales other than truck-scales.

Having described my invention, what I claim, and desire to secure by Letters Patent, is—

1. In a scale, the combination of a main frame, multiplying-levers, a platform bearing on the levers whereby weight exerting pressure on the platform at right angles thereto will depress the levers, and connections between the platform and levers whereby weight exerting pressure on the platform in the direction of the length thereof will also depress the levers, substantially as specified.

2. In a truck or portable scale, the combination of the truck-frame, a platform, multiplying-levers having lateral branches, connections between the platform and the main portions of the levers, and other connections between the platform and the lateral branches of said levers, substantially as specified.

3. In a scale of the truck or portable type, the combination of the truck-frame, a platform, multiplying-levers, connections between said levers and the platform, disposed at right angles or approximate right angles to the platform, and other connections between the levers and platform disposed in the direction of the length of the platform, substantially as specified.

4. In a portable or truck scale, the combination with the main frame of the truck, a platform having depending arms forward and rear multiplying-levers fulcrumed adjacent to their outer ends and connected together at their inner ends; the rear lever having lateral, upwardly-directed branches arranged in advance of its fulcrum-point, and the forward lever having lateral, downwardly-directed branches arranged in rear of its fulcrum-point, connections between the main portions of the levers and the arms of the platform, disposed at right angles to the platform, and other connections between the lateral branches of the levers and the arms of the platform; said latter connections extending forwardly from the lateral branches of the levers and being disposed in the direction of the length of the platform, substantially as specified.

5. In a scale, the combination of a main frame, supporting-wheels connected with said frame and arranged adjacent to the forward end thereof, a platform having depending arms, forward and rear multiplying-levers fulcrumed adjacent to their outer ends and connected together at their inner ends; the rear lever having lateral, upwardly-directed branches arranged in advance of its fulcrum-point, and the forward lever having lateral, downwardly-directed branches arranged in rear of its fulcrum-point and also having a rearwardly-extending extension, connections between the main portions of the levers and the arms of the platform, disposed at right angles to the platform, other connections between the lateral branches of the levers and the arms of the platform, extending forwardly from said lateral branches and disposed in the direction of the platform, a dial, a pointer, and mechanism intermediate of the pointer and the extension of the forward lever, substantially as specified.

6. In a scale, the combination of a main frame, multiplying-levers, a platform arranged to bear on the levers whereby weight exerting pressure on the platform at right angles thereto will depress the levers, connections between the platform and levers whereby weight exerting pressure on the platform in the direction of the length thereof will also depress the levers, a dial-plate, an arbor carrying a pointer and a pinion, a rack meshing with the pinion, and a lever connected with the rack and operative by one of the multiplying-levers, substantially as specified.

7. In a scale, the combination of a main frame, multiplying-levers, a platform, a dial-plate arranged at one end of the main frame, an arbor journaled in said plate and carrying a pointer and a pinion, a rack meshing with the pinion, an adjustable stop for said rack, a lever connected with the rack and operative by one of the multiplying-levers, an adjustable stop for said lever, a rod adjustably connected with the lever, a guide receiving said rod and adjustably connected with the main frame, and a spring surrounding the rod and interposed between the guide and the lever, substantially as specified.

8. In a scale, the combination of a main frame, multiplying-levers, a platform arranged to bear on the levers whereby weight-exerting pressure on the platform at right angles thereto will depress the levers; said platform having lugs on its under side, connections between the platform and levers whereby weight exerting pressure on the platform in the direction of the length thereof will also depress the levers, vertically-movable platform-supporting devices connected to the frame and arranged to impinge against the under side of the platform and engage the lugs thereon so as to hold the same against endwise movement, and suitable means for adjusting and adjustably fixing said arms, substantially as specified.

9. In a scale, the combination of a main frame, multiplying-levers, a platform arranged to bear on the levers whereby weight exerting pressure on the platform at right angles thereto will depress the levers; said platform having lugs on its under side, connections between the platform and levers whereby weight exerting pressure on the platform in the direction of the length thereof will also depress the levers, arms pivotally connected to opposite sides of the frame and arranged to impinge against the under side of the platform and engage the lugs thereon so as to support said platform and hold the same against endwise movement, toggle-levers at each side of the frame having their upper members pivotally connected to the arms, rock-shafts connected to the lower members of the toggle-levers at opposite sides of the frame, and a hand-lever connected with the toggle-levers, substantially as specified.

10. In a scale, multiplying-levers having lugs provided with longitudinal knife-edges and beveled ends serving in conjunction with the edges to form points, in combination with a main frame having bearings receiving the lugs of the multiplying-levers and provided with outer end walls for the engagement of the points of the lugs on the multiplying-levers, substantially as specified.

In testimony whereof I have hereunto set my hand in presence of two subscribing witnesses.

GEORGE W. CHANDLER.

Witnesses:
C. H. RAEDER,
THOMAS E. TURPIN.